April 15, 1969 W. H. COULTER ET AL 3,439,267

AUTOMATIC HEMATOCRIT MEASURING APPARATUS

Filed Oct. 20, 1965

INVENTORS:
WALLACE H. COULTER
WALTER R. HOGG
BY:
Silverman & Cass
ATTORNEYS

United States Patent Office 3,439,267

Patented Apr. 15, 1969

3,439,267

AUTOMATIC HEMATOCRIT MEASURING APPARATUS

Wallace H. Coulter, Miami Springs, and Walter R. Hogg, Hialeah, Fla., assignors to Coulter Electronics, Inc., Hialeah, Fla., a corporation of Illinois Filed Oct. 20, 1965, Ser. No. 498,554
Int. Cl. G01n 27/02
U.S. Cl. 324—71 15 Claims

ABSTRACT OF THE DISCLOSURE

A hematocrit measuring apparatus which scans a blood sample, separately determines the mean cell volume of the whole blood sample and the count of such cells, and then computes their product as a value proportional to hematocrit. In the preferred embodiment the computed, proportional product is applied to a read-out device which is calibrated for direct reading of the hematocrit content of the sample.

This invention relates generally to apparatus for measuring hematocrit and more particularly is concerned with an apparatus for giving an automatic determination of such value.

The hematocrit of blood is the ratio of the total volume of the red cells of a given sample of whole blood to the total volume of that sample, normally expressed as a percentage. This index is extremely useful in diagnostic studies and treatment of diseases whose symptoms and manifestations may include physical changes in the blood.

The classical method of determining hematocrit is: drawing blood to fill a tube, usually of capillary size; spinning the tube in a centrifuge to cause the cells to pack down to the bottom of the tube; then measuring the height of packed cells and comparing such measurement with the total column length including the substantially clear plasma. The computation of percentage is normally done by the use of one of several scales which are commercially available. This process is time consuming, requires multiple handling of samples, technically skilled workers and leaves considerable area for human error to occur.

According to the invention, one uses a blood cell counting apparatus and a mean cell volume meter, multiplies their respective outputs and obtains a value which is proportional to hematocrit. This is done automatically and without the need for centrifuging or making measurements. The achievement of this end is the principal object of the invention.

Since obtaining a red blood cell count is also an important process in diagnostic work, the invention enables the hematocrit to be obtained as a result of a test which would normally be called for in any event. The saving in time, effort and the elimination of multiple handling of sample are important advantages.

Other objects will become apparent from an examination of the drawing and explanation of a preferred embodiment.

Figures 1, 2, 3:
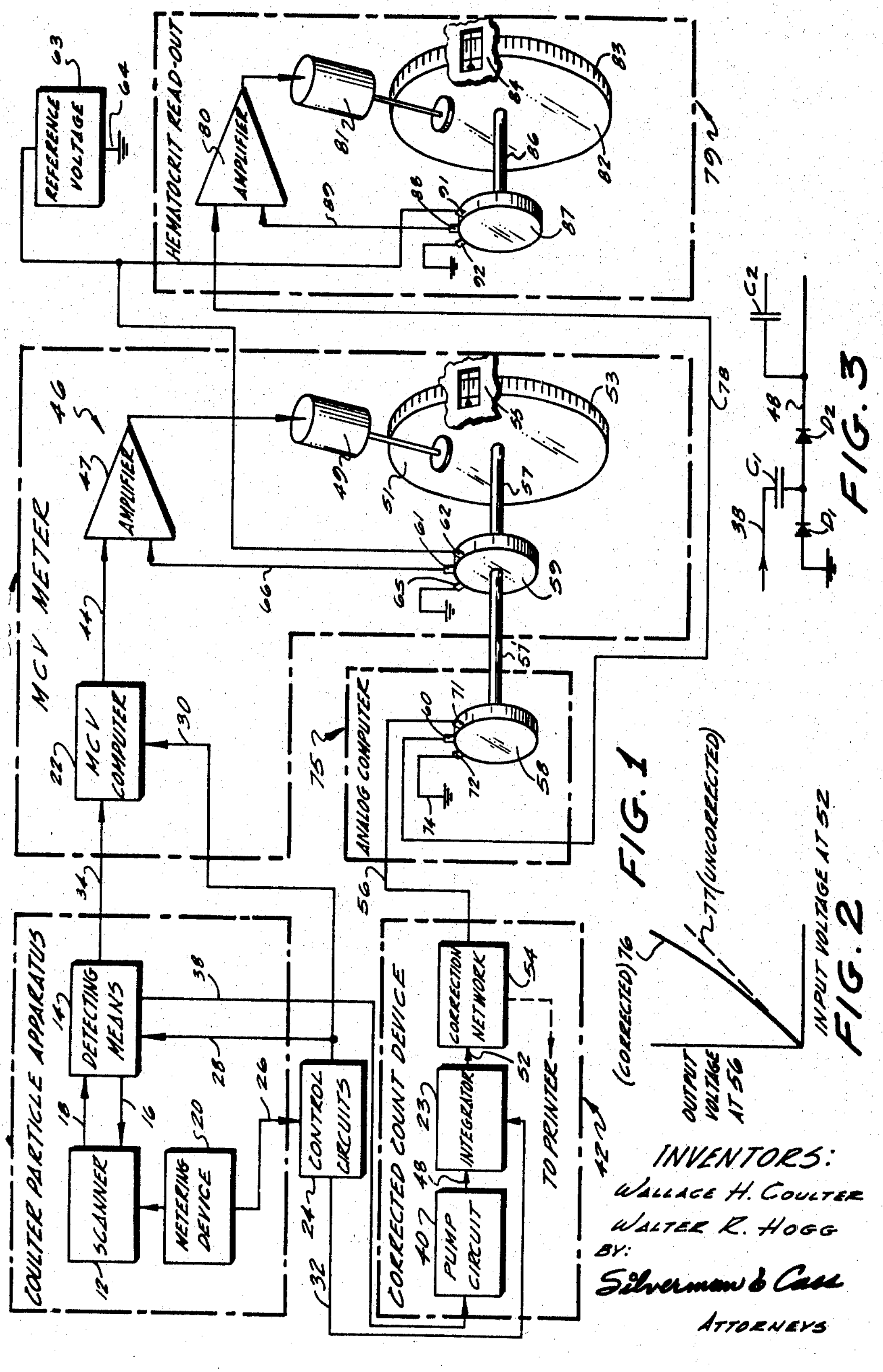
FIG. 1 is a block diagram of apparatus accomplishing automatic determination of hematocrit.
FIG. 2 is a diagram showing the transfer characteristics of a typical network for correcting cell count for coincidence.
FIG. 3 is a circuit diagram of a typical pump circuit.

At the present time there are several types of blood cell counters which give accurate blood cell counts automatically, notable of which are those constructed in accordance with the principles of Wallace H. Coulter, U.S. Patent No. 2,656,508, dated Oct. 20, 1953. In the case of apparatus of the so-called Coulter type, a suspension of the blood sample in some diluent is passed through an orifice of microscopic dimensions. The diluent is preferably a buffered electrolyte of suitable composition which will not alter the size of the cells. These electrolytes are in wide-spread use at this time. Each time a cell traverses the orifice there is a change in the electrical impedance of the diluent which is within the orifice. This change is used to provide an electrical signal whose amplitude is proportional to the actual cell volume and whose duration is equal to the time that the cell is passing through the sensing zone represented by the effective orifice. The number of red cells scanned, measured and counted so greatly outweighs that of the white cells, that for all practical statistical purposes only the red cell portion of the sample of whole blood is being measured.

The electrical signals are amplified and counted. They may be discriminated as to size by the use of various threshold circuits to achieve sizing if desired. The signals for any given sample may be electrically accumulated to give a value in the form of a voltage representing total count. Coincidence studies, through experimentation, have given rise to knowledge of factors by means of which the value representing count may be modified to give a corrected count that considers the statistical probability that some of the pulses produced by the scanner or orifice were caused by two or more cells passing through simultaneously.

Assuming the corrected count $Cc$ of a given sample is known, if one can obtain the mean cell volume MCV, also corrected for coincidence hematocrit will be $$Hct = MCV \times Cc$$

or hematocrit $Hct$ is equal to mean cell volume MCV multiplied by corrected count $Cc$. The factor of total blood volume including plasma may be considered in connection with the original dilution used to make the sample, but since the dilution is normally quite substantial, i.e. one part in 50,000, the presence or absence of plasma is insignificant.

As those skilled in the art will appreciate, the units in which the corrected count $Cc$ is expressed are the number of cells per cubic millimeter of whole blood. Since the dimensions of MCV are units of volume, usually cubic microns, the value of hematocrit is a dimensionless number less than unity and is usually expressed as a percentage. For example, for a sample having an MCV of 90 cubic microns and a red count or $Cc$ of 5 million cells per cubic millimeter, with a conversion of all volumes to the same dimensions by expressing the red count as $5(10^6)$ cells per $(10^9)$ cubic microns which is equal to 0.005 cell per cubic micron, multiplying this figure by 90 cubic microns cancels the cubic micron dimension and leaves the dimensionless product 0.45. Expressed as a percentage, this is of course 45%, i.e., 45% hematocrit. The formula for MCV is given in medical texts as $$MCV = \frac{\text{hematocrit (percent)}}{RBC(\text{millions/cu. mm.})} \times 10$$

the factor ten includes the $10^9$ to convert cubic millimeters to cubic microns, the $10^6$ in the denominator, and the 100 to convert from a decimal fraction to a percentage.

The operation of multiplying may be produced by a variety of means known to those skilled in this art. The embodiment described herein uses a simple potentiometer across which there is applied a voltage proportional to the corrected cell count. The slider of the potentiometer is moved physically to an angular position along the potentiometer proportional to MCV. The resulting voltage at the slider is then proportional to $Hct$ and may be indicated on a suitable scale.

In FIG. 1 at the left, there is shown in the broken line block 10 a Coulter particle counting apparatus of the type described above. The scanner 12 of the apparatus 10 consists of an aperture tube of well-known construction, as for example described in U.S. Patent 2,985,830, immersed in a suspension of blood cells of known dilution. Electrodes in the tube and in the suspension outside of the tube are supplied with a suitable aperture current from a source which is usually disposed in the same housing as the amplifiers, threshold circuits and the like, all of the latter being designated detecting means 14. The line or channel 16 indicates that the current source is in the block 14. Signals from the scanner 12 are applied to the detecting means 14 by way of an electrical path designated symbolically by the line 18.

Preferably the particle counting apparatus 10 includes a metering device 20 such as described in U.S. Patent 2,869,078. If a sample flow rate is known, a timer device may be utilized for controlling the operating cycle. Another method is mentioned below. In the metering device 20, when a predetermined volume of sample suspension has been metered, stop signals are produced which may be used in connection with suitable control circuits 24, to deenergize the apparatus. Suitable start signals are also obtained by the same metering device. In the apparatus shown, the MCV computer 22, the detecting means 14 and the integrator 23 (to be explained below) are energized and de-energized, if and as needed, by the metering device 20 and the control circuits 24 through suitable connections 26, 28, 30 and 32. The control circuits 24 perform their functions by means of relays, switching circuits, application and removal of biasing voltages from semi-conductors or amplifiers, etc. These functions, in addition to the energizing and/or de-energizing of circuits, could be resetting counters and the like apparatus.

The output of the Coulter particle apparatus 10 is applied by way of one channel 34 to the MCV computer 22 of the MCV meter 36 and by another channel 38 to the pump circuit 40 of a corrected count device 42. The channel 34 has pulses whose amplitudes are proportional to particle size. Accordingly these pulses have both count and volume information. The channel 38 has only count pulses of equal amplitude. The Coulter apparatus 10 will normally have counter means giving uncorrected count, and circuits are available in the apparatus 10 providing both types of outputs required at 34 and 38.

The construction and operation of the MCV meter 36 are described in an application for patent Ser. No. 441,-481, filed Mar. 22, 1965, entitled "Apparatus and Method for Determining Mean Particle Volume" and assigned to the same assignee as this application.

As understood from the said application, and by reference to the block diagram of FIG. 1, the MCV meter 36 comprises a computer 22 which drives a servo voltmeter designated generally 46. The voltmeter includes a servo-amplifier 47 whose output drives a motor 49 to cause rotation of a disc 51 carrying a scale 53 past a viewing window having an index mark as shown at 55. This rotative movement rotates the shaft 57 and its extension 57′ which rotate the sliders of the potentiometers 58 and 59. The slider of each of these potentiometers is connected to the center terminal thereof, as indicated at 60 and 61, respectively. The high potential terminal 62 of the potentiometer 59 is connected to a reference voltage source 63 that is grounded at 64 so that the reference voltage of the source 63 appears across the potentiometer 59 to ground, the low potential terminal 65 of the potentiometer 59 also being connected to ground.

Potentiometer 59 is a part of the servo voltmeter 46 and hence its slider terminal 61 is connected in a feedback path 66 to the amplifier 47.

It will be obvious that the angular disposition of the disc 51 which will be achieved when a balance condition exists will be proportional to MCV, and that this angular disposition is transmitted through the extension 57′ of the shaft 57 to the slider of the potentiometer 58. The scale 53 is suitably calibrated to read MCV at the window 55.

The second output of the detecting means 14, which, as stated above, contains only count information, is applied as electrical pulses by way of the channel 38 to a pump circuit 40 which pumps charge at 48 into the capacitor of an accumulating or integrator circuit 23. A typical pump circuit is illustrated in FIG. 3. Pulses arriving at 38 are transferred as discrete respective charges by "dipper" condenser C1 through diode D2 to the connection 48. Thence the charges are passed to a charge accumulating or "bucket" condenser C2 in the integrator 50. (Reference: Robert L. Chase, Nuclear Pulse Spectrometry, McGraw-Hill, 1961.)

The integrator 23 provides an output at 52 in the form of a voltage which is proportional to raw or uncorrected count. As noted, the integrator 23 is connected with the control circuits 24 by the connection 32. After a determination, the integrator 23 would require being reset to a completely discharged condition, and this may be achieved through the use of the control circuits 24. If desired, means may be provided to achieved control for the apparatus by the condition of charge of the integrator 23. For example, the integrator circuit 23 may be adjusted such that when a saturation point is reached, a signal is applied through the control circuits to deenergize the detecting means. Normally, the MCV computer is self-controlled since the only effect upon the output information at 57′ caused by varying the time that the computer is operating is to increase or decrease the statistical sampling.

The raw count at 52 may be corrected by operating upon it by factors to account for coincidence, and one such analog circuit may be indicated by the block 54. This may be in the form of a simple non-linear network or even some type of manually adjustable circuit to give a corrected count voltage at 56. This voltage is applied to the potentiometer 58 at the high potential terminal 71 so that it appears across the entire potentiometer. The low potential terminal 72 is connected to ground at 74. The potentiometer 58 comprises an analog computer 75, as will be explained shortly.

The correction network 54 provides the type of transfer characteristics which are generally illustrated in FIG. 2. The curve 76 comprises a plot of input voltage at 52 relative to output voltage at 56. The variation from a straight line function is shown by comparison with such a linear function illustrated as a broken line 77. The correction applied by the network is the difference between the two curves. For smaller concentrations where coincidence is of no consequence, the circuit 54 may be quite simple, or eliminated. The MCV meter will preferably have some form of coincidence correction incorporated therein, as previously mentioned.

By way of explanation, coincidence in the particle counting field is the effect of more than a single particle passing through the aperture at the same time. Obviously, there would be a single electrical pulse caused by such coincident passage, albeit larger than normal, but the counting circuits ordinarily could not recognize this. The resulting count is the raw or uncorrected count, appearing at 52, and it is lower than the true count by a factor which depends upon the concentration of the suspension sample. Statistical studies have established rather extensive information on coincidence correction, and such known data are used in the design of the correction network, if one is used.

The slider of the potentiometer 58 has its terminal 60 connected by way of the channel 78 to the hematocrit readout device 79. For convenience the slider will also be designated 60. There will be a voltage above ground at this line 78 which represents a measure of the voltage on the slider 60 of the potentiometer 58. Since the slider 60 of potentiometer 58 is mechanically coupled with the extension 57′ of shaft 57 which in turn assumes an angular disposition proportional to the MCV, the angular position of the slider 60 is also proportional to MCV. Additionally, since the voltage across the potentiometer 58 is proportional to the corrected count, the voltage at the slider 60 will also be proportional to corrected count *Cc*.

It follows from above, that since the voltage at 78 is proportional to MCV and *Cc* must be proportional to their product, and hence it is proportional to H*ct*. Accordingly, a voltmeter connected from 78 to ground will read a value which may be calibrated in the form of percent hematocrit. Indeed, the hematocrit read-out 79 is basically this form of device, namely—a simple voltmeter connected from line 78 to ground. It is much more advantageous to use a servo voltmeter which will give a read-out in the form of a dial moving relative to a window which may, if desired be arranged to keep its position at the end of a run so that the information may be preserved for a time to obviate continuous surveillance. Likewise, such a device can operate a recorder, if needed.

The hematocrit read-out device 66 in FIG. 1 has a servo amplifier 80 which drives a motor 81 that rotates a disc 82 on the circumference of which there is a scale 83. The scale is calibrated in hematocrit percent H*ct* and moves relative to a window 84 that has a suitable index mark to cooperate with the scale. The disc 82 rotates the shaft 86 that in turn moves the slider of the potentiometer 87. The slider is connected with the center terminal 88 which has a feedback connection 89 with the amplifier 80. A reference voltage is connected across the potentiometer from the high potential terminal 91 to ground terminal 92. Conveniently, the reference voltage source 63 may also be used for the servo voltmeter 79.

It will be appreciated that the potentiometer 58 by being mechanically connected to the MCV meter and the corrected count device 42 in the manner described performs the multiplying operation of MCV multiplied by *Cc* so that the output at 78 is H*ct*. This, then is an analog computer. In this embodiment of the invention, the computer 75 is relatively simple. Other forms of computer with more sophisticated circuitry or using known multiplying techniques may be used to perform the multiplication.

In the construction of an apparatus of this kind, one may build the equipment with a minimum of complexity by requiring standard volumes of sample to be used of certain specific dilution so that the read-out device may be calibrated to read directly percentage packed cell volume.

It will be noted that the user of the apparatus will have the value MCV displayed in the window 55, and will ordinarily have a count value in the counters of the detecting means 14. A printer may be connected to the correction network 54 as shown by the broken line, to give corrected count simultaneously with the other two values.

What it is desired to secure by Letters Patent of the United States is:

1. A hematocrit meter comprising, (a) cell counting and sizing apparatus having output channel means and providing signals at said channel means related to information on count and volume of cells, (b) a mean cell volume meter coupled to said channel means and responsive to said information and having first output means providing quantity information related to the mean cell volume of said cells, (c) count accumulating means coupled to said channel means and responsive to only the count information thereof and having second output means providing quantity information related to the count of said cells, and (d) an analog computer having said first and second output means connected thereto to apply the information from both to said computer as inputs, said computer including means to multiply said quantity information from both output means by one another, and providing an output proportional to both; and hence, proportional to the hematocrit of a sample of whole blood which is the source of said signals.

2. A hematocrit meter as claimed in claim 1 in which the first output means is a rotating member and the quantity information is in the form of angular disposition of said member relative to an initial position.

3. A hermatocrit meter as claimed in claim 1 in which there are means correcting the information from said second output means to compensate for coincidence occurring in said cell counting and sizing apparatus.

4. A hematocrit meter as claimed in claim 1 in which there is a read-out device responsive to said computer output to indicate a hematocrit quantity represented by said output.

5. A hematocrit meter as claimed in claim 4 in which said read-out device comprises a voltmeter.

6. A hematocrit meter as claimed in claim 1 in which said computer includes a potentiometer having a resistance element and a movable tap, the first output means is electrically connected to said potentiometer to apply said count information as a voltage across the resistance element, the second output means is mechanically connected to said potentiometer to apply said mean cell volume information as a position of the tap along said resistance element, and the output proportional to both being taken as a voltage at said tap.

7. A hematocrit meter as claimed in claim 6 in which a voltmeter is connected to said tap and the high potential end of said resistance element to indicate a voltage proportional to hematocrit.

8. A hematocrit meter as claimed in claim 7 in which the voltmeter is a servo voltmeter including a rotary scale calibrated to read hematocrit.

9. A hematocrit meter as claimed in claim 1 in which the cell counting and sizing apparatus includes a scanner which produces a single pulse for each scanned cell, the mean cell volume meter includes a servo amplifier having a rotary scale the angular disposition relative to a zero position providing said information related to mean cell volume, the count accumulating means comprises a pulse actuated pump circuit and an integrator accumulating charge from said pump circuit, the analog computer comprises a potentiometer having a slider coupled with said rotary scale to rotate therewith and having the integrator connected across the resistance element of said computer, and in which the output proportional to mean cell volume and cell count includes electrical means for connecting a voltmeter to measure the voltage at said slider.

10. The hematocrit meter of claim 9 in which there is a voltmeter connected to the potentiometer to read the voltage at the tap.

11. The hematocrit meter of claim 9 in which there is a coincidence correction network between the integrator and the potentiometer.

12. A hematocrit meter as claimed in claim 11 in which means are provided to initiate and discontinue the operation of the counting and sizing apparatus and the count device simultaneously.

13. A hematocrit meter as claimed in claim 11 in which the voltmeter is a servo voltmeter and includes a rotary scale read-out device.

14. A hematocrit meter comprising:

(a) a cell counting and sizing apparatus adapted to scan single cells and produce discrete signals each proportional to cell volume, said apparatus having one output channel for signals containing information related to cell size and count and a second output channel for signals containing information related to cell size only, (b) a count device connected to the second output and including an accumulating device having an electrical output channel providing a voltage proportional to total cell count, (c) a mean cell volume meter connected to the first output and having a servo voltmeter including a rotating member whose angular disposition relative to a zero position is proportional to mean cell volume, (d) a potentiometer having its resistance element coupled to the electrical output channel so that the voltage proportional to cell count is applied across said resistance element from its high to its low potential terminal ends, and the slider of the potentiometer being connected mechanically to the rotating member, and (e) a voltmeter connected from the slider to the low potential terminal end, whereby the potentiometer derives a value proportional to hematocrit and the voltmeter is capable of providing a readout in percent of hematocrit.

15. A hematocrit meter comprising:

(a) a cell counting and sizing device, (b) a cell count accumulating device connected to the counting device, (c) a mean cell volume meter connected to the cell counting and sizing device, (d) a multiplying device having the cell count accumulating device and the mean cell volume meter connected thereto to apply their outputs to the multiplying device as inputs of said multiplying device, and (e) a read-out device responsive to the output of said multiplying device, whereby the output of said multiplying device is proportional to the hematocrit of a blood sample introduced to said hematocrit meter, and said read-out device is calibrated to provide a hematocrit reading.

References Cited

UNITED STATES PATENTS 3,250,987 5/1966 Okada et al. ---------- 324—30

RUDOLPH V. ROLINEC, *Primary Examiner.*

E. E. KUBASIEWICZ, *Assistant Examiner.*

US. Cl. X.R.

235—92; 88—14